United States Patent [19]

Nakaya et al.

[11] Patent Number: 5,058,918
[45] Date of Patent: Oct. 22, 1991

[54] SUSPENSION SYSTEM FOR MOTOR VEHICLE

[75] Inventors: Katsunori Nakaya; Masashi Kitagawa, both of Saitama, Japan

[73] Assignee: Honda Giken Kogyo Kabushiki Kaisha, Tokyo, Japan

[21] Appl. No.: 490,075

[22] Filed: Mar. 7, 1990

[30] Foreign Application Priority Data

| Mar. 8, 1989 [JP] | Japan | 1-55716 |
| Mar. 8, 1989 [JP] | Japan | 1-55717 |
| Mar. 8, 1989 [JP] | Japan | 1-55718 |
| Mar. 8, 1989 [JP] | Japan | 1-55719 |
| Mar. 8, 1989 [JP] | Japan | 1-55720 |

[51] Int. Cl.$^5$ ............... B60G 11/08; B60G 17/02
[52] U.S. Cl. ............... 280/718; 280/707; 280/688
[58] Field of Search ............ 280/699, 661, 692, 718, 280/724, 707; 217/31, 48, 47; 33/DIG. 13; 73/788, 795, 802, 768

[56] References Cited

U.S. PATENT DOCUMENTS

| 2,004,063 | 6/1935 | Ganz | 180/362 |
| 3,140,083 | 7/1964 | Mahrle | 267/256 |
| 3,169,026 | 2/1965 | Soer | 280/788 |
| 3,204,717 | 9/1965 | Collins | 180/256 |
| 3,499,662 | 3/1970 | Mahrle | 280/712 |
| 4,411,159 | 10/1983 | Spear et al. | 267/47 |
| 4,619,457 | 10/1986 | Lafferty | 273/269 |
| 4,858,950 | 5/1989 | Kajiwara et al. | 280/719 |
| 4,903,984 | 2/1990 | Kajiwara et al. | 280/712 |

FOREIGN PATENT DOCUMENTS

| 0044191 | 1/1982 | European Pat. Off. . |
| 2-266005 | 5/1988 | European Pat. Off. . |
| 0291886 | 11/1988 | European Pat. Off. . |
| 318753 | 6/1989 | European Pat. Off. . |
| 0337488 | 10/1989 | European Pat. Off. . |
| 2541841 | 3/1977 | Fed. Rep. of Germany . |
| 2722015 | 11/1978 | Fed. Rep. of Germany . |
| 2927486 | 1/1981 | Fed. Rep. of Germany . |
| 3004158 | 8/1981 | Fed. Rep. of Germany . |
| 664698 | 9/1929 | France . |
| 1483928 | 6/1967 | France . |
| 60-106807 | 7/1985 | Japan . |
| 60-155610 | 10/1985 | Japan . |
| 1266005 | 10/1989 | Japan . |

Primary Examiner—Richard A. Bertsch
Attorney, Agent, or Firm—Irving M. Weiner; Joseph P. Carrier; Pamela S. Burt

[57] ABSTRACT

A suspension system for use on a motor vehicle includes a suspension having a leaf spring as a resilient member, and a plurality of strain gauges mounted on the leaf spring in suitable locations thereon. The value of a strain of the leaf spring in a particular position where one of the strain gauges is disposed is estimated on the basis of the measured value of a strain which is detected by another strain gauge. The difference between the estimated strain value and the value of a strain detected by the strain gauge in the particular position is then calculated. A deteriorated condition of the leaf spring can now be determined according to the calculated difference which is checked according to a preset reference or criterion.

32 Claims, 11 Drawing Sheets

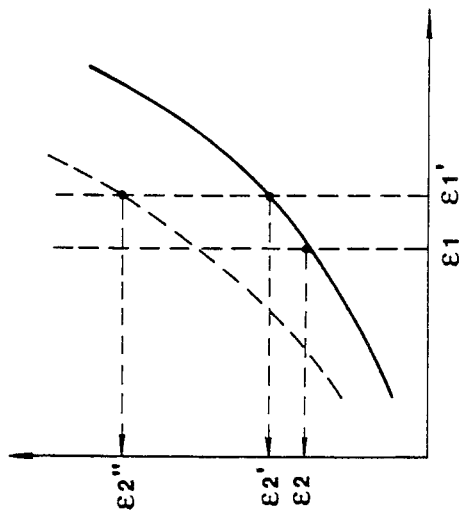
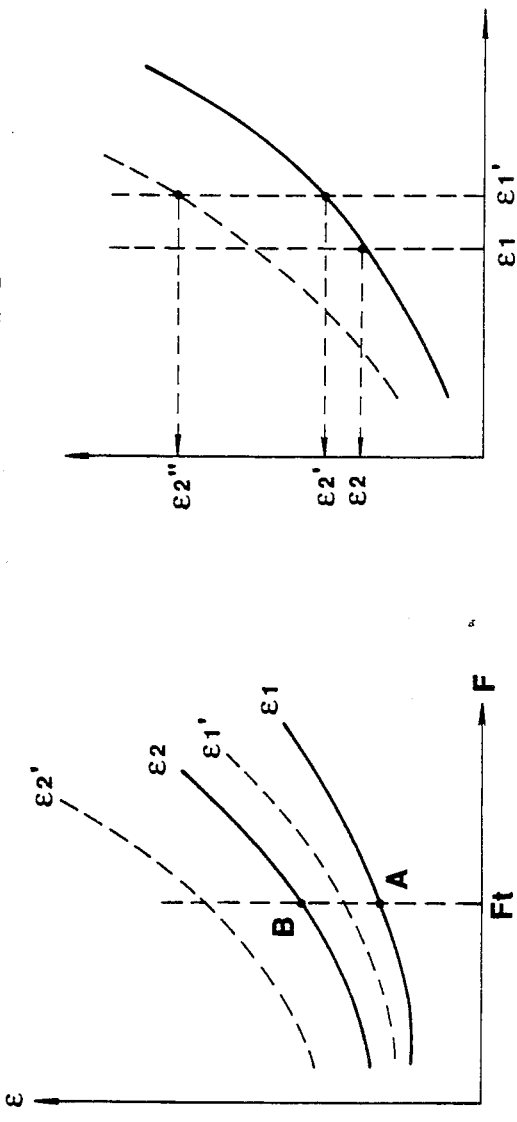
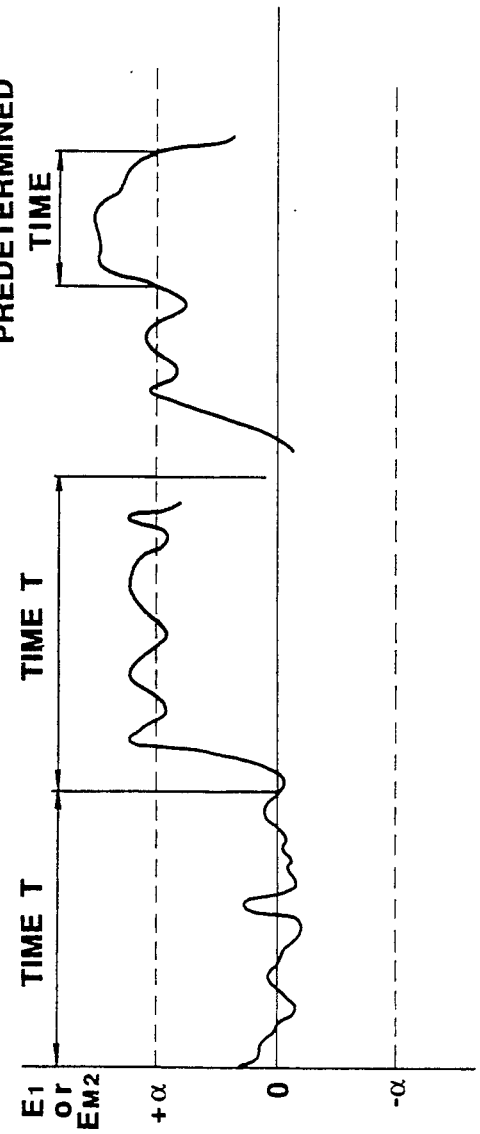

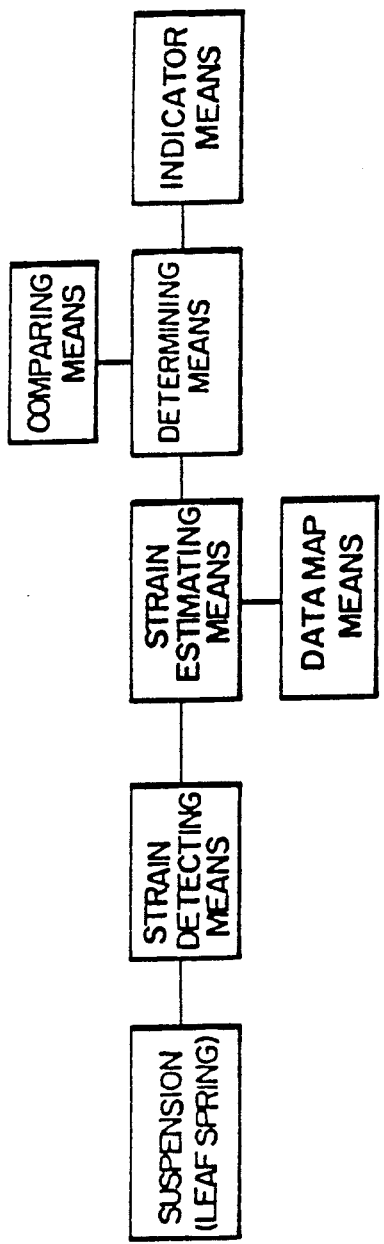
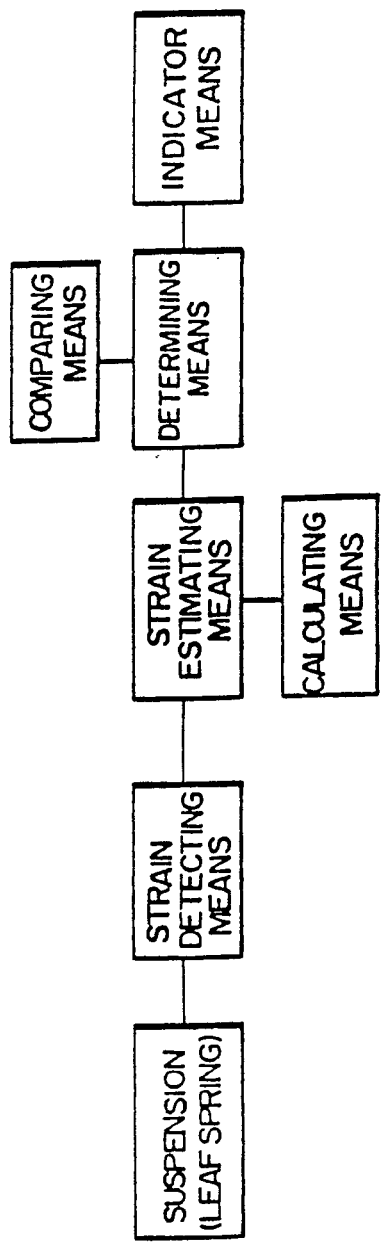

SUSPENSION SYSTEM FOR MOTOR VEHICLE

BACKGROUND OF THE INVENTION

1. Field of the Invention

The present invention relates to an improved suspension system for a motor vehicle, and more particularly to a motor vehicle suspension system having strain detector means for detecting a strain of the suspension which represents the degree to which the suspension is deteriorated, i.e., a deteriorated condition of the suspension.

2. Description of the Relevant Art

Japanese Laid-Open Utility Model Publication No. 60(1985)-106807 discloses a strut-type suspension which comprises a shock absorber with a coil spring. The shock absorber is coupled at its upper end to a motor vehicle body through a resilient member and also coupled at its lower end to a steering knuckle. An electrically conductive rubber layer serving as a strain detector is disposed on the resilient member. A running condition of the motor vehicle can be confirmed if a change in the electric resistance of the rubber layer, as it is elastically expanded and contracted, is detected.

Another suspension system disclosed in Japanese Laid-Open Patent Publication No. 1(1989)-266005 includes a leaf spring with its opposite ends angularly movably coupled to respective left and right steering knuckles. The leaf spring is associated with a strain gauge which detects any strain of the leaf spring when the leaf spring flexes, so that a change in the load on the road wheels or a change in the height of the motor vehicle can be known from the detected signal from the strain gauge.

The above conventional suspension systems are not designed to detect a deteriorated condition of the suspension, although the strain detector or gauge is able to give information with respect to the running condition of the motor vehicle. However, it is desirable to be able to detect a deteriorated condition of motor vehicle suspensions from the standpoint of maintaining the quality of the suspensions above a certain level.

SUMMARY OF THE INVENTION

It is an object of the present invention to provide a motor vehicle suspension system having means for detecting, as a parameter, a strain of one suspension component and giving an accurate indication of the degree to which the suspension system is deteriorated with time, based on the detected strain.

A suspension system for use on a motor vehicle according to the present invention includes a suspension having a resilient member. The suspension comprises a double-wishbone-type suspension and is associated with each of left and right front road wheels, for example, of the motor vehicle. Each of the suspensions comprises a steering knuckle, an upper control arm having one end swingably coupled to an upper end of the steering knuckle and an opposite end swingably coupled to the motor vehicle body, and a lower control arm having one end swingably coupled to a lower end of the steering knuckle and an opposite end swingably coupled to the motor vehicle body. A leaf spring, serving as the resilient member, has one end connected to the lower control arm and the other end to the motor vehicle body. A central portion of the leaf spring may be swingably and slidably joined to the motor vehicle body, with the leaf spring serving as a stabilizer. The lower control arm may be dispensed with, and the leaf spring may be swingably coupled directly to the lower end of the steering knuckle.

The suspension system further includes a plurality of strain gauges mounted on the leaf spring, for detecting strains of the leaf spring. The strain gages should preferably be located in positions where the leaf spring is deteriorated at different speeds. One of the strain gauges is disposed in a position where the leaf spring is deteriorated at the highest speed. The estimated or theoretical value of a strain in one of the positions where the strain gauges are located is determined from the value of a strain which is measured by one of the strain gauges in the other positions. Then, the actual value of the strain in said one position is measured by the strain gauges in that position. The estimated strain value and the measured strain value are compared with each other, thereby finding the difference therebetween. The difference is checked according to a preset decision reference or criterion, for thereby determining if a deteriorated condition of the leaf spring exists.

A suspension system according to another embodiment of the invention additionally has a loading device for applying a known distributed load to the leaf spring. The value of a strain of the leaf spring in a particular position thereon is estimated based on the value of the known load and at least one of the strains measured by the strain gauges. The actual value of the strain in the particular position is then measured by the strain gauges in that position. Then, the difference between the estimated and measured strain values is determined and checked according to a preset decision reference for thereby determining if deteriorated condition of the leaf spring exists.

A load detecting device may be disposed on the suspension, e.g., at a joint where the leaf spring is coupled to the steering knuckle of the suspension. The value of a strain of the leaf spring in a particular position is estimated from a parameter, i.e., a load, detected by the load detecting device, and the measured value of a strain detected by one of the strain gauges. The estimated value of the strain and the value of the strain which is measured by the strain gauges in the particular position are compared with each other, and the difference therebetween is determined. Then, the difference is checked according to a preset decision reference for thereby determining if a deteriorated condition of the leaf spring exists.

The strain value in the particular position may be estimated from the strain value measured by the strain gauge and the parameter such as as the load, according to a data map or a calculating process.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3 is a graph showing the relationship between loads and strains;

FIG. 4 is a graph illustrating the relationship between strains of a leaf spring at different locations thereon;

FIG. 5 is a block diagram of a motor vehicle suspension system according to the present invention;

FIG. 6 is a block diagram of a motor vehicle suspension system according to another embodiment of the present invention;

FIG. 7 is a graph showing data based on which a deteriorated condition of a suspension is determined;

DETAILED DESCRIPTION OF THE PREFERRED EMBODIMENTS

Figure 1:
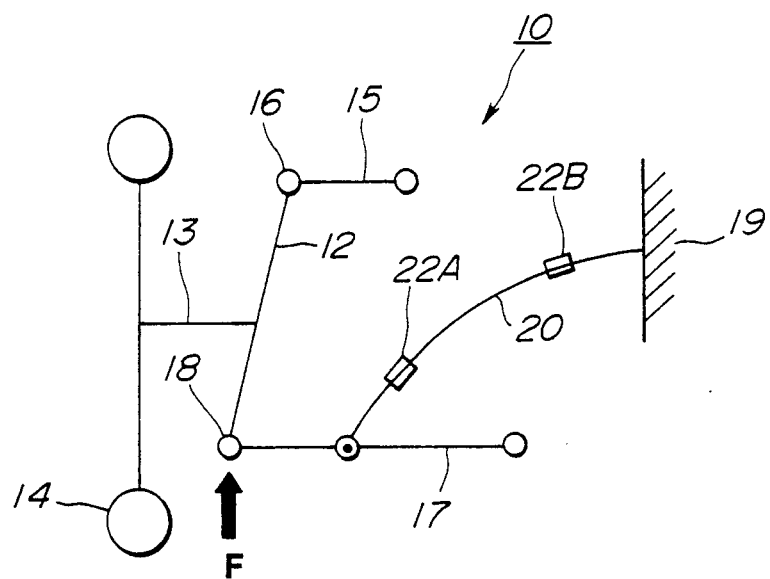
FIG. 1 is a schematic front elevational view of the mechanical arrangement of a motor vehicle suspension system according to an embodiment of the present invention.

Like or corresponding parts are denoted by like or corresponding reference numerals throughout the several views.

FIG. 1 schematically shows the mechanical arrangement or suspension of a motor vehicle suspension system according to the present invention. A double-wishbone-type suspension 10 is associated with a left road wheel 14. Although not shown, an identical suspension is also associated with a right road wheel. The suspension 10 includes a steering knuckle 12 and a spindle 13 mounted on the steering knuckle 12, with the road wheel 14 rotatably supported on the spindle 13. The outer end of an upper control arm 15 is vertically swingably joined to the upper end of the steering knuckle 12 through a suitable joint such as a ball-and-socket joint 16. The outer end of a lower control arm 17 is also vertically swingably joined to the lower end of the steering knuckle 12 through a ball-and-socket joint 18. The upper and lower control arms 15, 17 have their inner ends vertically swingably coupled to a motor vehicle body 19. Therefore, the outer ends of the upper and lower control arms 15, 17 are prevented from swinging back and forth with respect to the motor vehicle body 19. It is not necessary to add separate members such as struts to the upper and lower control arms 15, 17.

A resilient member 20 in the form of a leaf spring extends substantially horizontally between the motor vehicle body 19 and the lower control arm 17. The leaf spring 20 is supported at its inner end on the motor vehicle body 19 in a cantilevered fashion, and has an outer end angularly movably attached to the lower control arm 17. Two strain gauges 22A, 22B are mounted on the leaf spring 20. When the leaf spring 20 is strained, the strain or distortion thereof is detected by the strain gauges 22A, 22B. The strain gauges 22A, 22B are disposed in locations where the leaf spring 20 is strained at different speeds. It is preferable that the inner strain gauge 22B be installed in the area where the leaf spring 20 is strained at the highest speed, i.e., in the vicinity of the joint where the inner end of the leaf spring 20 is coupled to the motor vehicle body 19.

Figure 2:
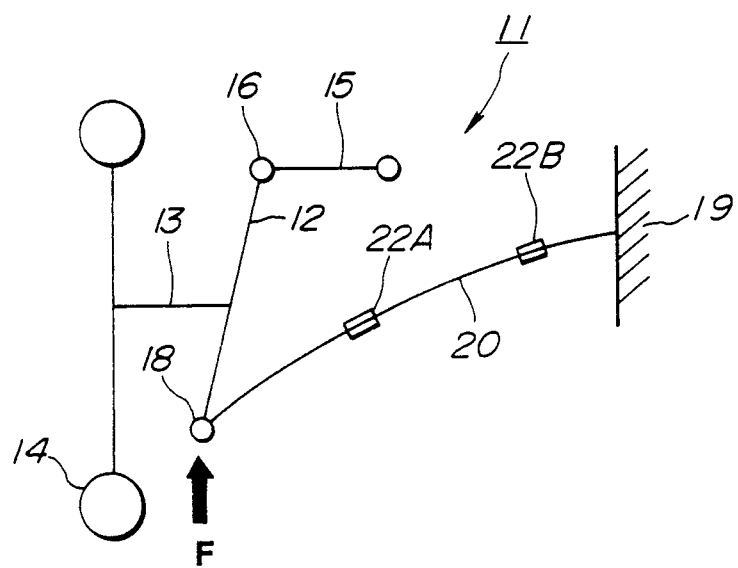
FIG. 2 is a schematic front elevational view of the mechanical arrangement of a modification of the suspension system shown in FIG. 1.

FIG. 2 shows a modified suspension 11 in which the outer end of the leaf spring 20 is swingably connected to the lower end of the steering knuckle 12 and thus doubles as a lower control arm.

If a resilient member such as a leaf spring has certain physical configurations and stable chemical properties, then a load (force) F applied to the resilient member and a strain or distortion s produced in a particular position on the resilient member in response to the load F are related to each other as follows:

$$\epsilon_N = f_P(F) \tag{1}$$

From the equation (1), the strains of the resilient member in a plurality of locations thereon can be expressed by:

$$\epsilon_1 = f_1(F)$$

$$\epsilon_2 = f_2(F)$$

$$\epsilon_3 = f_3(F)$$

If the load is eliminated from the above equations, it can be understood that the values of the strains have a certain correlation. That is, $$\epsilon_1 = f_N(\epsilon_2, \epsilon_2, \ldots) \quad (2)$$

Therefore, the value of a strain among strains produced at plural locations can be estimated from the measured values of the strains according to the equation (2). The estimated value $\epsilon'$ is given by:

$$\epsilon'_1 = f_1(\epsilon_2, \epsilon_3, \ldots)$$

$$\epsilon'_2 = f_2(\epsilon_1, \epsilon_3, \ldots)$$

$$\epsilon'_3 = f_3(\epsilon_1, \epsilon_2, \ldots) \quad (3)$$

When a certain region of a resilient member such as a leaf spring is deteriorated, the values of strains in that region and adjacent regions are increased. In order to detect a deterioration of a leaf spring, therefore, the values of strains of the leaf spring at a plurality of locations thereof are measured, and the value of a strain at any desired location is estimated from the measured values. Comparison between the estimated-strain value and the measured strain value at the desired location can determine whether the leaf spring, or a suspension which employs the leaf spring, is deteriorated or not.

FIG. 3 shows the relationship between loads and strains which are caused by the loads. When a load Ft is applied to the leaf spring 20, the value $\epsilon_1$ of a strain produced at a location A is measured, and then the value $\epsilon'_2$ of a strain at a location B is estimated from the measured strain value. Then, the strain at the location B is measured, and the measured strain value $\epsilon_2$ is compared with the estimated strain value $\epsilon'_2$. If the suspension is normal, then the strain value $\epsilon_1$ at the location A and the strain values $\epsilon_2$ at the location B are related to each other as indicated by the solid-line curve in FIG. 4. However, if a portion of the suspension is deteriorated, then the strain values $\epsilon_1$, $\epsilon_2$ are related to each other as indicated by the broken-line curve in FIG. 4. More specifically, a strain value $\epsilon'_2$ is estimated from a measured value $\epsilon'_1$, but actually a strain value $\epsilon''_2$ is measured. In this case, there is a difference between the estimated and measured strain values.

The strain values $\epsilon_1$, $\epsilon_2$ are calculated according to the following equations (4):

$$\epsilon_1 = k_1 F + k_2 \quad (4)$$

$$\epsilon_2 = k_3 F + k_4$$

where $k_1$, $k_2$ are coefficients depending on the distances from the joint between the leaf spring 20 and the lower control arm 17 (FIG. 1) or between the leaf spring 20 and the knuckle 12 (FIG. 2) to the respective strain gages, and $k_2$, $k_4$ are corrective terms (which are necessary because the actual leaf spring does not exactly match the theory of beams).

Elimination of F from the equations (4) results in:

$$\epsilon_1 = k_{11}\epsilon_2 + k_{12} \quad (5)$$

$$\epsilon_2 = k_{21}\epsilon_1 + k_{22}$$

where $$k_{11} = \frac{k_1}{k_3}, \quad k_{12} = k_2 - \frac{k_1 \cdot k_4}{k_3}$$

$$k_{21} = \frac{k_3}{k_1}, \quad k_{22} = k_4 - \frac{k_2 \cdot k_3}{k_1}$$

If it is assumed that the values of strains measured by the strain gauges 22A, 22B at the time the leaf spring 20 is normal in FIGS. 1 and 2 are indicated by $\epsilon'_1$, $\epsilon'_2$, respectively, then the strains estimated from these measured values are indicated as follows:

$$\epsilon''_1 = k_{11}\epsilon'_2 + k_{12} \quad (6)$$

$$\epsilon''_2 = k_{21}\epsilon'_1 + k_{22}$$

The differences E between the measured and estimated values are given by:

$$E_1 = |\epsilon''_1 - \epsilon'_1| \quad (7)$$

$$E_2 = |\epsilon''_2 - \epsilon'_2|$$

For example, if the leaf spring 20 is greatly deteriorated in the vicinity of its outer end, the value of $\epsilon'_1$ varies greatly, but the value of $\epsilon'_2$ does not vary substantially. The differences $E'_1$, $E'_2$ between the measured and estimated values at this time are given as follows:

$$E'_1 > \alpha \quad (8)$$

$$E'_2 > \beta$$

The leaf spring 20 is determined as being deteriorated if $$|E'_1 - E'_2| > \gamma, \text{ or}$$

$$|E'_1 - E'_2| > \delta$$

where $\alpha$, $\beta$, $\gamma$, $\delta$ are predetermined values which define ranges for detecting deteriorations.

In an actual application, the suspension system has a computer which determines estimated strain values from a data map, as shown in FIG. 5, which stores the relationship between strain values and load values, or calculated values based on measured load values, as shown in FIG. 6. Then, the computer compares the estimated strain values with the measured strain values to determine whether the leaf spring 20 is deteriorated or not. If the leaf spring 20 is found as being deteriorated, then the computer energizes a suitable alarm means to issue an alarm or a display means to display a deteriorated condition. FIG. 7 shows, by way of example, data for determining a deteriorated condition of the leaf spring 20. In the example of FIG. 7, the leaf spring 20 is judged as being deteriorated if the difference exceeds the predetermined value α over a predetermined period of time or a predetermined number of times (four times in FIG. 7) within a unit period of time, the leaf spring 20 is determined as being deteriorated. The value α, the unit period of time, and the number of times are determined in advance according to the results of an actual test.

Figure 8:
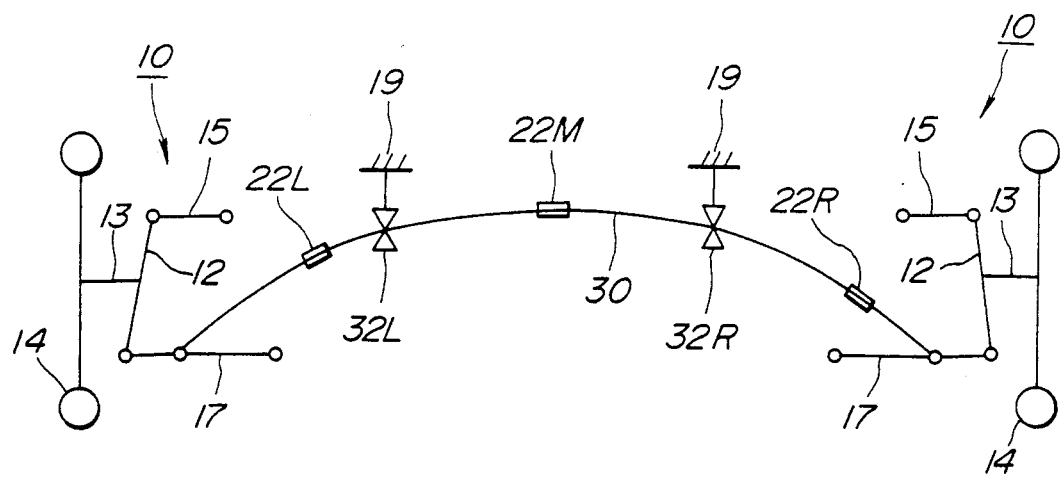
FIG. 8 is a schematic front elevational view of the mechanical arrangement of a motor vehicle suspension system according to still another embodiment of the present invention.

FIG. 8 shows the mechanical arrangement of a motor vehicle suspension system according to another embodiment of the present invention. The suspension system includes a leaf spring 30 which is longer than the leaf spring 20 shown in FIG. 1 and extends substantially horizontally bewteen left and right double-wishbone-type suspensions 10. More speficifically, the leaf spring 30 has opposite ends swingably coupled to left and right lower control arms 17 and has two central portions which are rotatably and slidably supoprted on a motor vehicle body 19 by respective support members 32R, 32L. The leaf spring 30 supports thereon three strain gauges, i.e., a strain gauge 22R disposed between the support member 32R and the lower control arm 17 of the right suspension 10, a strain gauge 22M disposed between the support members 32R, 32L, and a strain gauge 22L disposed between the support member 32L and the lower control arm 17 of the left suspension 10. The strain gauges 22R, 22M, 22L detect strains when the leaf spring 30 is strained or distorted adjacent to these strain gauges. At least two of these three strain gauges 22R, 22M, 22L should preferably be positioned at regions- where the leaf spring 30 is deteriorated at different speeds, e.g., between the support member 32R and the support member 32L and between the support member 32L and the left end of the leaf spring 30. Furthermore, at least one of these three strain gauges 22R, 22M, 22L should preferably be positioned at a region where the leaf spring 30 is deriorated at the highest speed, i.e., in the vicinity of one of the support members 32L, 32R.

Figure 9:
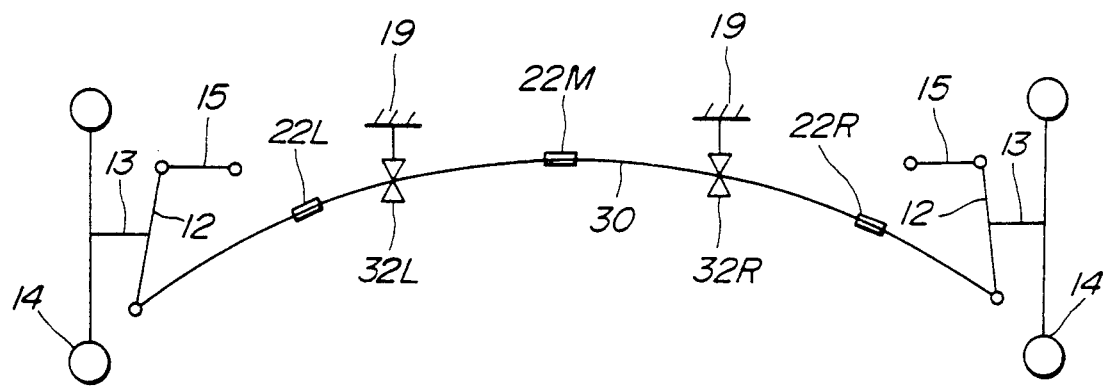
FIG. 9 is a schematic front elevational view of the mechanical arrangement of a modification of the motor vehicle suspension system shown in FIG. 8.
Figure 10:
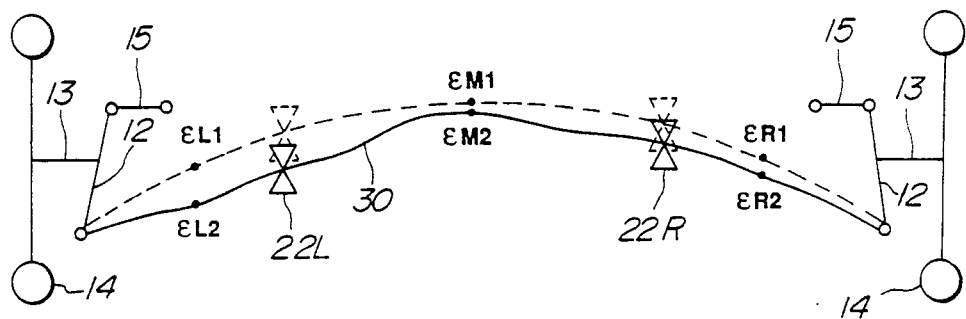
FIG. 10 is a view similar to FIG. 9, showing the manner in which the leaf spring of the suspension system is strained.

FIG. 9 shows a modified motor vehicle suspension system which differs from the suspenion system shown in FIG. 8 in that an elongate leaf spring 30 has its opposite ends swingably connected directly to the lower ends of the left and right steering knuckles 12, respectively. The leaf spring 30 shown in FIG. 9 serves as a stabilizer and also as a lower control arm. In the arrangement of FIG. 9, the three strain gauges 22R, 22M, 22L are disposed between the support member 32R and the right end of the leaf spring 30, between the support members 32R, 32L, and between the support member 32L and the leaf spring 30. While the strain gauges are employed as means for detecting strains of the leaf spring, such means are not limited to the strain gauges according to the present invention.

The values $\epsilon_{R1}$, $\epsilon_{M1}$, $\epsilon_{L1}$ of strains detected by the respective strain gauges 22R, 22M, 22L are related to each other according to the following equation:

$$\epsilon_{M1} = k_1 \epsilon_{R1} + k_2 \epsilon_{L1} + k_3 \quad (9)$$

where $k_1$ is a coefficient depending on the distance between the strain gauges 22R and the right end of the leaf spring 30, $k_2$ is a coefficient depending on the distance between the strain gauge 22L and the left end of the leaf spring 30, and $k_3$ is a corrective term.

Figure 11:
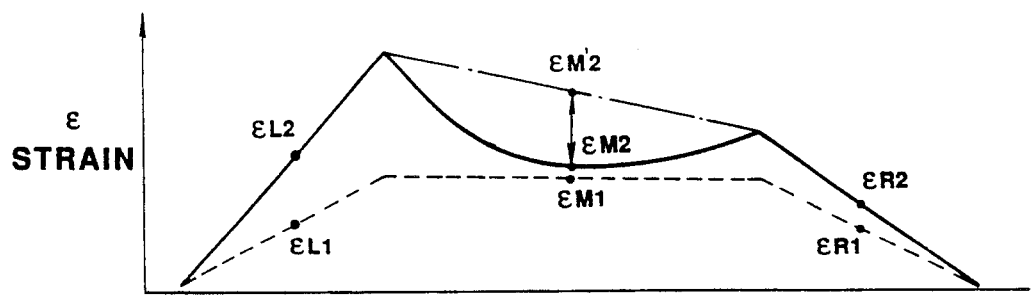
FIG. 11 is a graph showing the strain of a leaf spring which is supported in two positions on a motor vehicle body, at the time the leaf spring is strained outwardly of the supporting positions.

If the leaf spring 30 is deteriorated in the vicinity of the strain gauge 22L as shown in FIG. 11, then the strain value $\epsilon_{L1}$ varies considerably ($\epsilon_{L1} \rightarrow \epsilon_{L2}$). This strain variation is caused by a reduction in the Young's modulus or by a reduction in the modulus of section. When the leaf spring is thus deteriorated, the motor vehicle body is inclined slightly to the left. This inclination of the motor vehicle body applies a load on the right road wheel, whereupon the strain value $\epsilon_{R1}$ varies slightly ($\epsilon_{R1} \rightarrow \epsilon_{R2}$). Though the portion of the leaf spring 30 between the support members 32R, 32L slightly varies in its shape, almost no strain is produced in that portion of the leaf spring 30 ($\epsilon_{M1} \rightarrow \epsilon_{M2}$).

When the measured values $\epsilon_{R2}$, $\epsilon_{L2}$ of strains of the leaf spring 30 outwardly of the support members 32R, 32L are substituted into the equation (9), the value of a strain of the leaf spring between the support members 32R, 32L can be estimated (estimated value $\epsilon'_{M2}$).

$$\epsilon'_{M2} = k_1 \epsilon_{R2} + k_2 \epsilon_{L2} + k_3 \quad (10)$$

The difference $E_{M2}$ between the estimated value $\epsilon'_{M2}$ and the measured value $\epsilon_{M2}$ is expressed as follows:

$$E_{M2} = |\epsilon'_{M2} - \epsilon_{M2}| \quad (11)$$

If the suspension, i.e., the leaf spring 30, is deteriorated, the value of this difference $E_{M2}$ exceeds a predetermined value.

Figure 12:
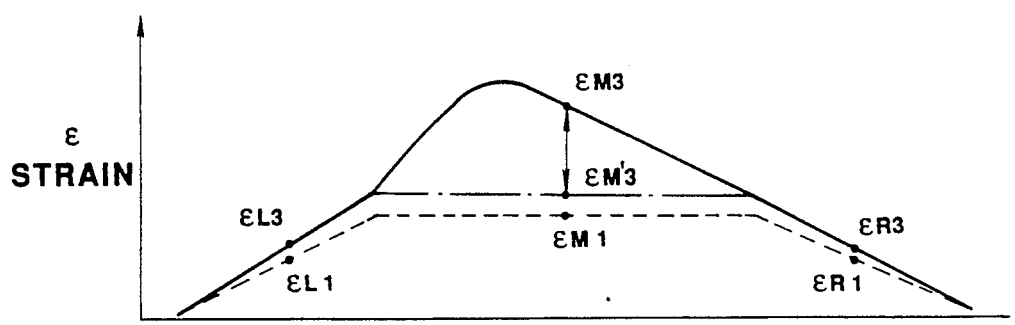
FIG. 12 is a graph similar to FIG. 11, showing the strain of the leaf spring at the time it is strained inwardly of the supporting positions.

Now, if the leaf spring 30 is deteriorated between the support members 32R, 32L, the value of the strain of the leaf spring 30 between the support members 32R, 32L varies considerably ($\epsilon_{M1} \rightarrow \epsilon_{M2}$), as shown in FIG. 12. On the other hand, the strain values of the portions of the leaf spring which lie outwardly of the support members 32R, 32L remain substantially unchanged ($\epsilon_{R1} \rightarrow \epsilon_{R3}$, $\epsilon_{L1} \rightarrow \epsilon_{L3}$).

The estimated value (theoretical value) $\epsilon'_{M3}$ of the strain of the leaf spring 30 between the support members 32R, 32L can be determined according to the following equation:

$$\epsilon'_{M3} = k_1 \epsilon_{R3} + k_2 \epsilon_{L3} + k_3 \quad (12)$$

The difference $E_{M3}$ between the estimated value $\epsilon'_{M3}$ and the measured value $\epsilon_{M3}$ is expressed as follows:

$$E_{M3} = |\epsilon'_{M3} - \epsilon_{M3}| \quad (13)$$

If the leaf spring 30 is actually deteriorated between the support members 32R, 32L, then the value of this difference, $E_{M3}$ exceeds a predetermined value several times such as shown in FIG. 7. The determination of the deterioration will not be described in detail as it has already been described above with reference to FIGS. 5 through 7.

While the three strain gauges have been described and shown in the embodiments of FIGS. 8 and 9, the number of strain gauges which can be used is not limited to three. The accuracy of strain detection can be increased by increasing the number of locations where strain gauges are to be installed, or suitably positioning strain gauges, e.g., in regions where the leaf spring is deteriorated at different speeds.

Figure 13:
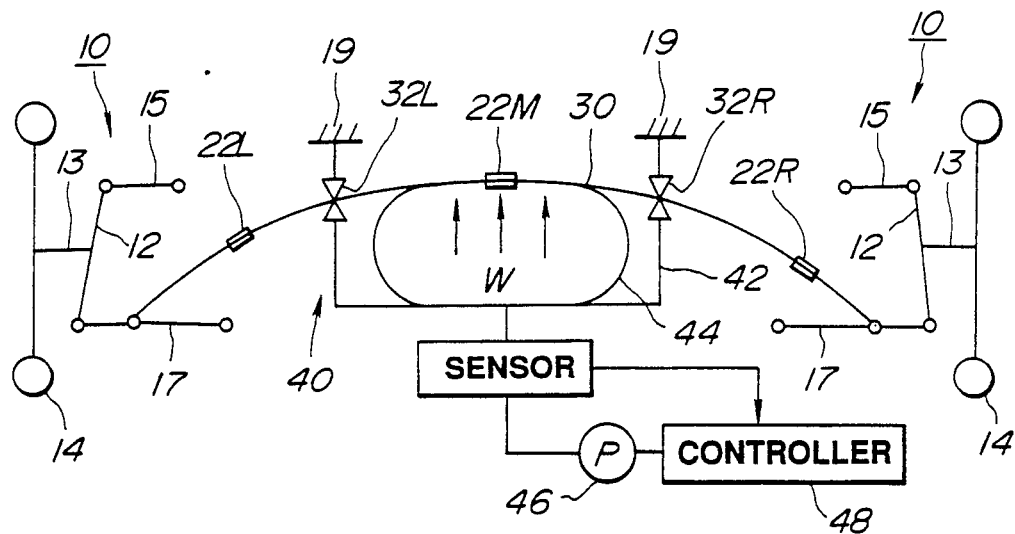
FIG. 13 is a schematic front elevational view of a motor vehicle suspension system according to a further embodiment of the present invention.
Figure 14:
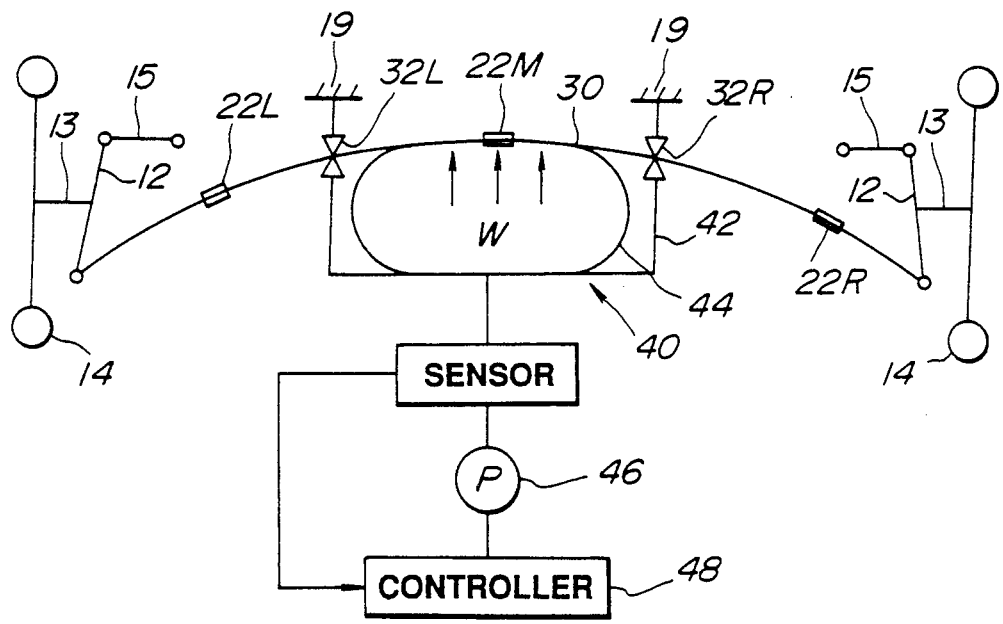
FIG. 14 is a schematic front elevational view of a modification of the suspension system illustrated in FIG. 13.

Suspension systems according to other embodiments shown in FIGS. 13 and 14 differ from the suspension systms shown in FIGS. 8 and 9 in that they additionally have a loading device. Therefore, the components other than the loading device and associated units will not be described in detail in relation to the embodiments of FIGS. 13 and 14. In each of the embodiments shown in FIGS. 13 and 14, a loading device 40 which serves as a vehicle height adjusting actuator has a beam 42 extending as a holder between the left and right support members 32R, 32L and an air bag 44 held by the beam 42 for applying a known distributed load W to the leaf spring 30. The air pressure in the air bag 44 can be changed by a pump 46 which is controlled by a controller 48 to keep the air, pressure at a certain desired level. Instead of air which is a compressible fluid, a non-compressible fluid may be filled in the bag 44.

Figure 15:
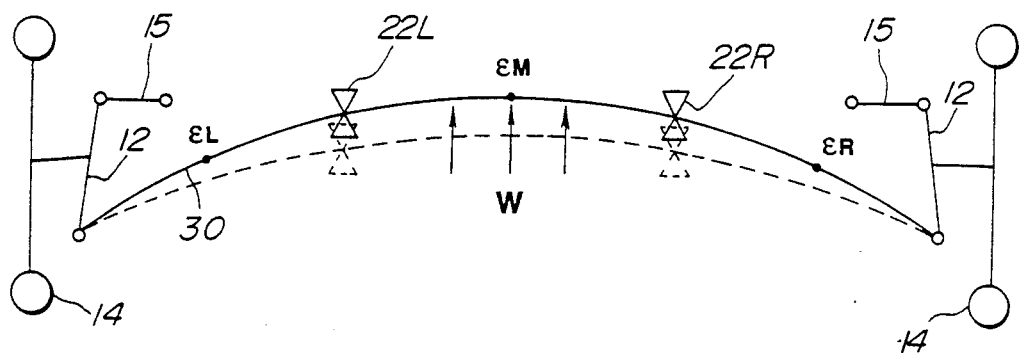
FIG. 15 is a view similar to FIG. 14, showing the manner in which the leaf spring is subjected to a known load.

It is now assumed that the leaf spring 30 is not deteriorated and is elastically deformed under a load W from the shape indicated by the broken line in FIG. 15 to the shape indicated by the solid line. Then, the known load W applied by the loading device 40 and the values $\epsilon_L$, $\epsilon_M$, $\epsilon_R$ of strains detected by the respective strain gauges 22R, 22M, 22L are related to each other according to the following equation, irrespective of the running conditions of the motor vehicle:

$$\epsilon_M = k_1\epsilon_R + k_2\epsilon_L + k_3W + k_4 \qquad (14)$$

where $k_1$, $k_2$ are coefficients depending on the distances from the strain gauges to the opposite ends of the leaf spring 30, $k_3$ is a coefficient depending on the position where the load is applied or the range in which the load is applied, and $k_4$ is a corrective term (which is necessary because the actual leaf spring does not exactly match the theory of beams).

Figure 16:
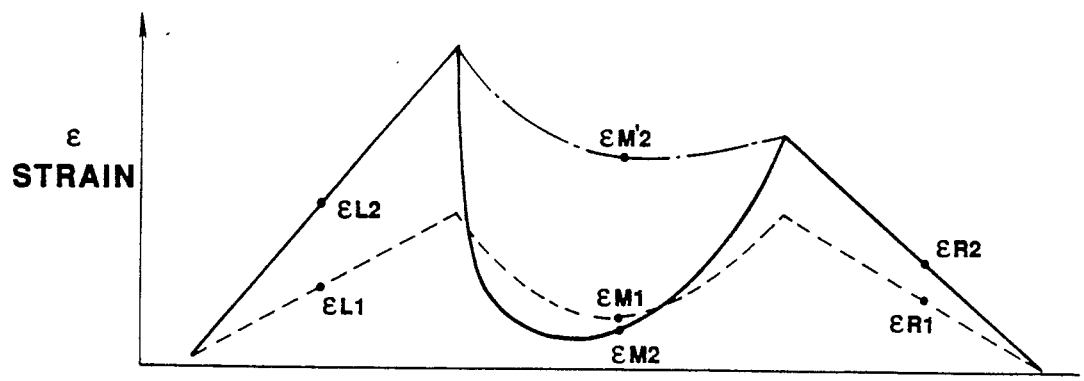
FIG. 16 is a graph showing the strain of a leaf spring which is supported in two positions on a motor vehicle body, at the time the leaf spring is strained outwardly of the supporting positions.

If the leaf spring 30 is deteriorated in the vicinity of the strain gage 22L as shown in FIG. 16, then the strain value $\epsilon_{L1}$ varies considerably ($\epsilon_{L1} \rightarrow \epsilon_{L2}$). As described previously, this strain variation is caused by a reduction in the Young's modulus or by a reduction in the modulus of section. When the leaf spring is thus deteriorated, the motor vehicle body is inclined slightly to the left. This inclination of the motor vehicle body applies a load on the right road wheel, whereupon the strain value $\epsilon_{R1}$ varies slightly ($\epsilon_{R1} \rightarrow \epsilon_{R2}$). Though the portion of the leaf spring 30 between the support members 32R, 32L varies slightly in its shape, almost no strain is produced in that portion of the leaf spring 30 ($\epsilon_{M1} \rightarrow \epsilon_{M2}$).

When the measured values $\epsilon_{R2}$, $\epsilon_{L2}$ of strains of the leaf spring 30 outwardly of the support members 32R, 32L are substituted into the equation (14), the value of a strain of the leaf spring between the support members 32R, 32L can be estimated (estimated value $\epsilon'_{M2}$).

$$\epsilon'_{M2} = k_1\epsilon_{R2} + k_2\epsilon_{L2} + k_3 \qquad (15)$$

The difference $E_{M2}$ between the estimated value $E_{M2}$ and the measured value $\epsilon_{M2}$ is expressed as follows:

$$E_{M2} = |\epsilon'_{M2} - \epsilon_{M2}| \qquad (16)$$

If the suspension, i.e., the leaf spring 30, is deteriorated, the value of this difference $E_{M2}$ exceeds a predetermined value.

Figure 17:
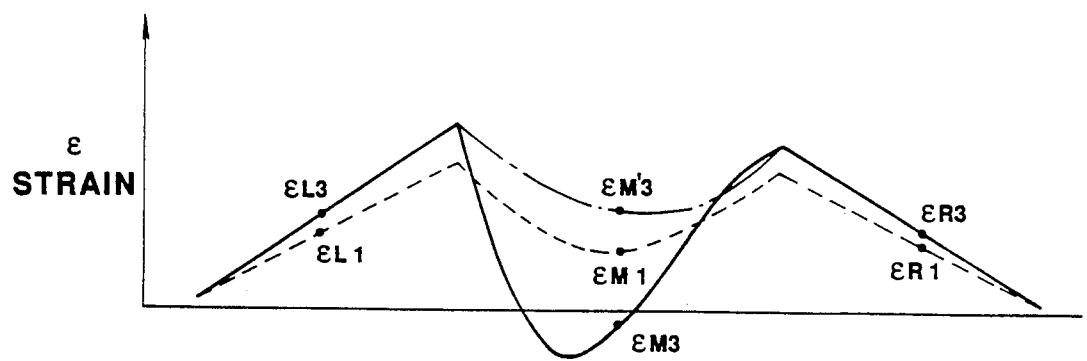
FIG. 17 is a graph similar to FIG. 16, showing the strain of the leaf spring at the time it is strained inwardly of the supporting positions.

Now, if the leaf spring 30 is deteriorated between the support members 32R, 32L, the value of the strain of the leaf spring 30 between the support members 32R, 32L varies considerably ($\epsilon_{M1} \rightarrow \epsilon_{M3}$), as shown in FIG. 17. On the other hand, the strain values of the portions of the leaf spring which lie outwardly of the support members 32R, 32L remain substantially unchanged ($\epsilon_{R1} \rightarrow \epsilon_{R3}$, $\epsilon_{L1} \rightarrow \epsilon_{L3}$).

The estimated value (theoretical value) $\epsilon'_{M3}$ of the strain of the leaf spring 30 between the support members 32R, 32L can be determined according to the following equation:

$$\epsilon'_{M3} = k_1\epsilon_{R3} + k_2\epsilon_{L3} + k_3W + k_4 \qquad (17)$$

The difference $E_{M3}$ between the estimated value $\epsilon'_{M3}$ and the measured value $\epsilon_{M3}$ is expressed as follows:

$$E_{M3} = |\epsilon'_{M3} - \epsilon_{M3}| \qquad (18)$$

If the leaf spring 30 is actually deteriorated between the support members 32R, 32L, then the value of this difference $E_{M3}$ exceeds a predetermined value several times such as shown in FIG. 7. The determination of the deterioration will not be described in detail as it has already been described above with reference to FIGS. 5 through 7.

Figure 18:
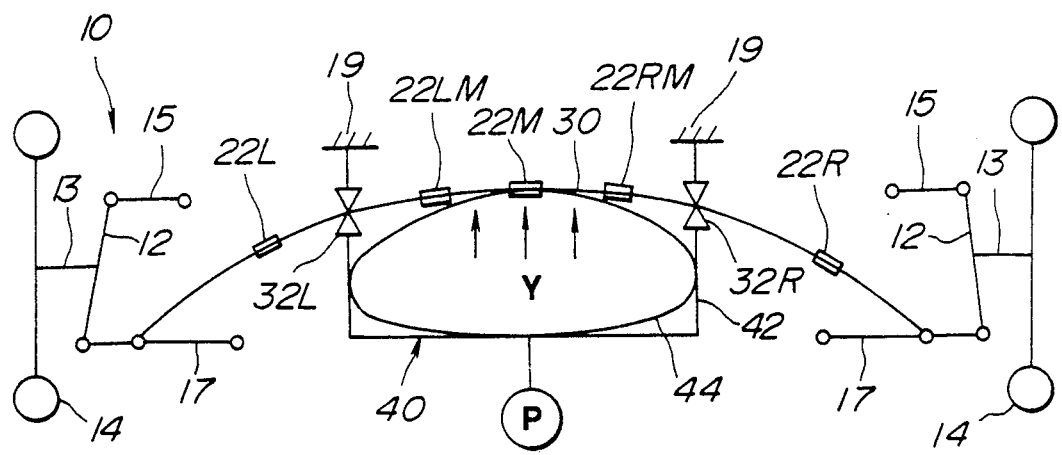
FIG. 18 is a schematic front elevational view of the mechanical arrangement of a motor vehicle suspension system according to a still further embodiment of the present invention.
Figure 19:
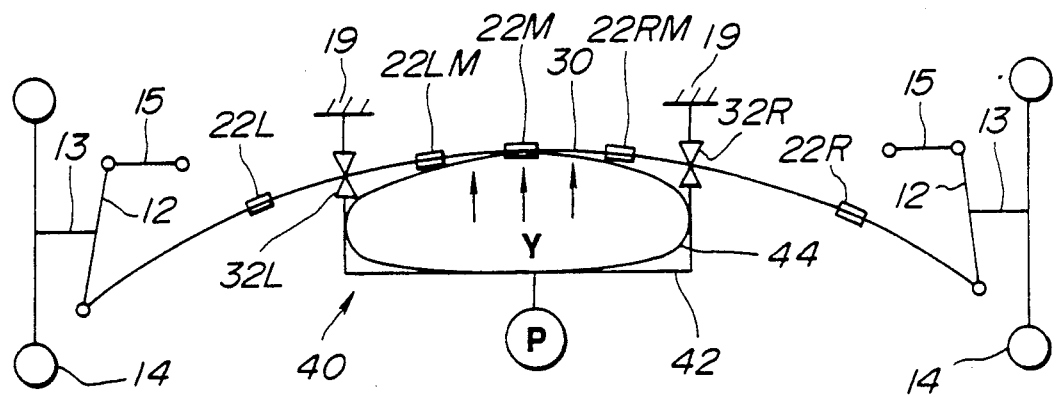
FIG. 19 is a schematic front elevational view of the mechanical arrangement of a modification of the suspension system illustrated in FIG. 18.

Suspension systems according to other embodiments shown in FIGS. 18 and 19 differ from the suspension systems shown in FIGS. 13 and 14 in that the magnitude of a distributed load applied to the leaf spring 30 by the loading device 40 is unknown. Therefore, three strain gauges 22RM, 22M, 22Lm are disposed on the leaf spring 30 between the support members 32R, 32L. A total of five strain gages, including these three strain gauges and the other two strain gauges 22R, 22L positioned outwardly of the support members 32R, 32L, are mounted on the leaf spring 30. As with the embodiments described above, at least one of the strain gauges should preferably be positioned in the vicinity of the support members 32R, 32L where the leaf spring 30 tends to be easily deteriorated. The accuracy with which any strain can be detected is increased as the number of strain gauges used is increased.

Figure 20:
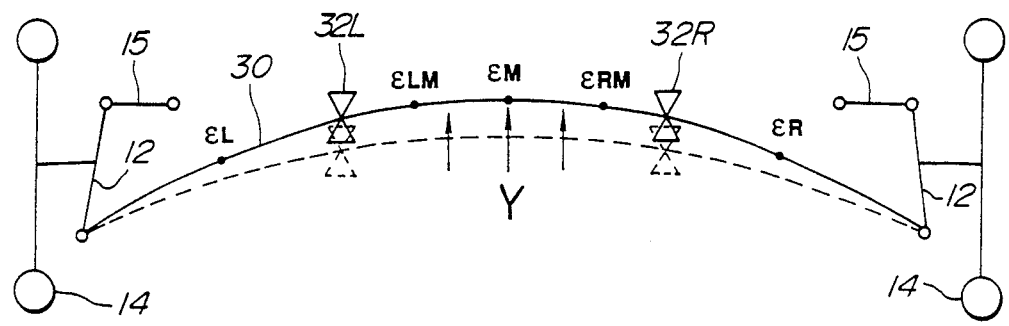
FIG. 20 is a view similar to FIG. 19, showing the manner in which the leaf spring is subjected to a known load.

It is now assumed that the leaf spring 30 is not deteriorated and is elastically deformed under an unknown load Y from the normal shape indicated by the broken line in FIG. 20 to the shape indicated by the solid line. Then, the unknown load Y and the values $\epsilon_R$, $\epsilon_{RM}$, $\epsilon_M$, $\epsilon_{LM}$, $\epsilon_L$ of strains detected by the respective strain gages 22R, 22RM, 22M, 22LM, 22L are related to each other according to the following equation, irrespective of the running conditions of the motor vehicle:

$$Y = k_1\epsilon_M + k_2\epsilon_{RM} + k_3\epsilon_{LM} + k_4 \qquad (19)$$

where $k_1$, $k_2$, $k_3$ are coefficients depending on the positions where the strains are detected, and the position or range where the load is applied, and $k_4$ is a corrective term (which is necessary because the actual leaf spring does not exactly match the theory of beams).

The unknown load Y can thus be determined from the strain values $\epsilon_{RM}$, $\epsilon_M$, $\epsilon_{LM}$ of the leaf spring 30 between the support members 32R, 32L.

The following equation is also satisfied:

$$\epsilon_M = k_5\epsilon_R + k_6\epsilon_L + k_7W + k_4 \qquad (20)$$

where $k_5$, $k_6$ are coefficients depending on the positions where the strains are detected, $k_7$ is a coefficient depending on the position or range in which the load is applied, and $k_8$ is a corrective term.

Figure 21:
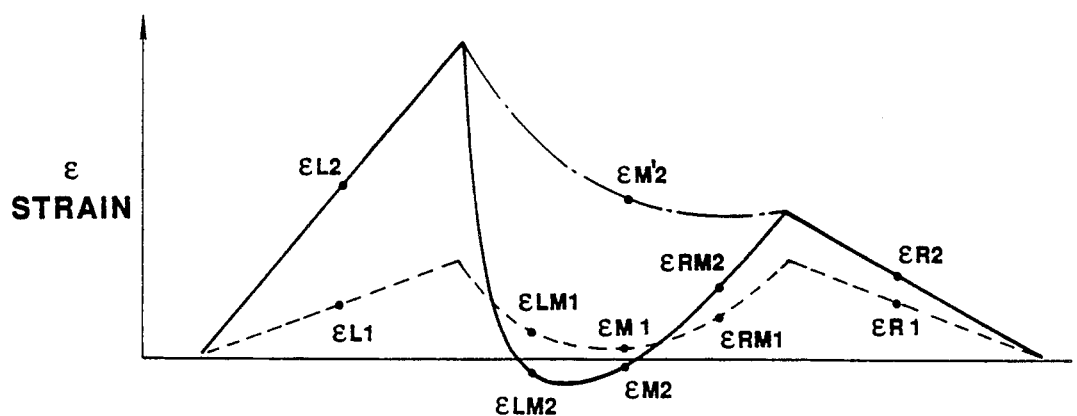
FIG. 21 is a graph showing the strain of a leaf spring which is supported in two positions on a motor vehicle body, at the time the leaf spring is strained outwardly of the supporting positions.

If the leaf spring 30 is deteriorated in the vicinity of the strain gauge 22L as shown in FIG. 21, then the strain value $\epsilon_{L1}$ varies considerably ($\epsilon_{L1} \rightarrow \epsilon_{L2}$). This strain variation is caused by a reduction in the Young's modulus or by a reduction in the modulus of section. When the leaf spring is thus deteriorated, the motor vehicle body is inclined slightly to the left. This inclination of the motor vehicle body applies a load on the right road wheel, whereupon the strain value $\epsilon_{R1}$ varies slightly ($\epsilon_{R1} \to \epsilon_{R2}$). Though the portion of the leaf spring 30 between the support members 32R, 32L varies slightly in its shape, almost no strain is produced in that portion of the leaf spring 30 ($\epsilon_{RM1} \to \epsilon_{RM2}$, $\epsilon_{M1} \to \epsilon_{M2}$, $\epsilon_{LM1} \to \epsilon_{LM2}$).

Using the value of the load Y, the value of a strain of the central portion of the leaf spring 30 between the support members 32R, 32L is estimated according to the equation (20) as follows (estimated value $\epsilon'_{M2}$):

$$\epsilon'_{M2} = k_5\epsilon_{R2} + k_6\epsilon_{L2} + k_7(k_1\epsilon_{M2} + k_2\epsilon_{RM2} + k_3\epsilon_{LM2} + k_4) + k_8 \quad (21)$$

The difference $E_{M2}$ between the estimated value $\epsilon'_{M2}$ and the measured value $\epsilon_{M2}$ is expressed as follows:

$$E_{M2} = |\epsilon'_{M2} - \epsilon_{M2}| \quad (22)$$

If the suspension, i.e., the leaf spring 30, is deteriorated, the value of this difference $E_{M2}$ exceeds a predetermined value.

Figure 22:
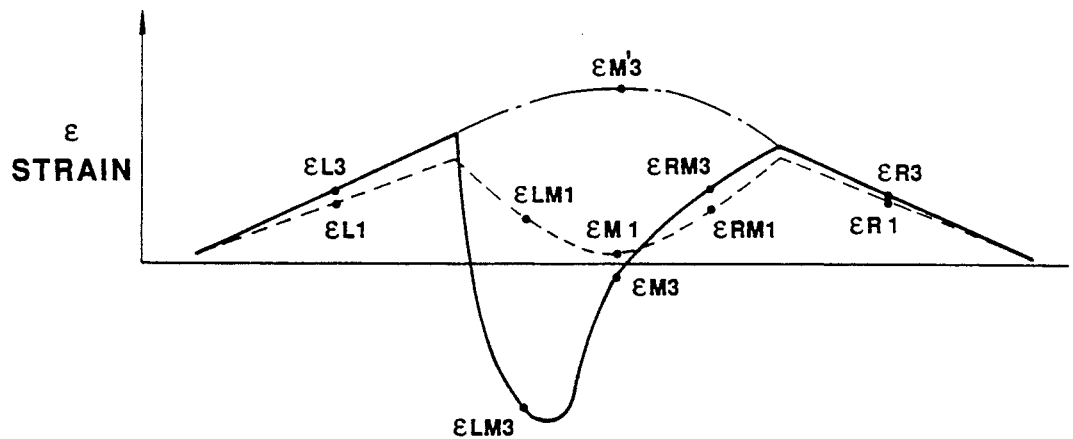
FIG. 22 is a graph similar to FIG. 21, showing the strain of the leaf spring at the time it is strained inwardly of the supporting positions.

Now, if the leaf spring 30 is deteriorated in the vicinity of the strain gauge 22LM, the value of the strain of the leaf spring 30 near the strain gauge 22LM varies considerably ($\epsilon_{LM1} \to \epsilon_{LM3}$) as shown in FIG. 22. Therefore, the value of the load Y determined according to the equation (19) is considerably different from the actual value. On the other hand, the strain values of the portions of the leaf spring which lie outwardly of the support members 32R, 32L remain substantially unchanged ($\epsilon_{L1} \to \epsilon_{L3}$, $\epsilon_{R1} \to \epsilon_{R3}$).

According to the equation (20) above, the estimated value $\epsilon'_{M3}$ of a strain of the central portion of the leaf spring between the support members 32R, 32L is given as follows:

$$\epsilon'_{M3} = k_5\epsilon_{R2} + k_6\epsilon_{L3} + k_7(k_1\epsilon_{M3} + k_2\epsilon_{RM3} + k_3\epsilon_{LM3} + k_4) + k_8 \quad (23)$$

The difference $E_{M3}$ between the estimated value $\epsilon'_{M3}$ and the measured value $\epsilon_{M3}$ is expressed as follows:

$$E_{M3} = |\epsilon'_{M3} - \epsilon_{M3}| \quad (24)$$

If the suspension, i.e., the leaf spring 30, is deteriorated, the value of this difference $E_{M3}$ exceeds a predetermined value.

The values $\epsilon'_{RM}$, $\epsilon'_R$, $\epsilon'_L$, $\epsilon'_{LM}$ of strains in the other locations are also estimated, and the differences $E_{RM}$, $E_R$, $E_L$, $E_{LM}$ between these estimated strain values and the measured strain values are calculated. Then, the suspension can always be monitored for any deteriorated condition (see FIGS. 5 and 6) based on the decision criterion shown in FIG. 7.

Figure 23:
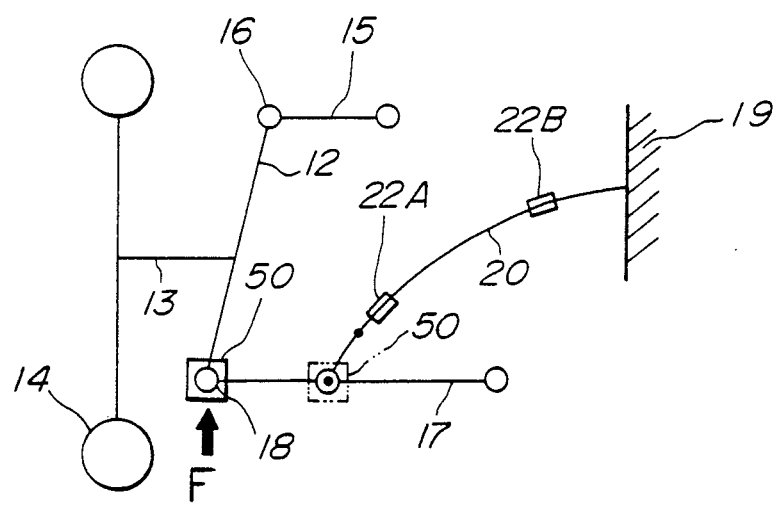
FIG. 23 is a schematic front elevational view of the mechanical arrangement of a motor vehicle suspension system according to another embodiment of the present invention.
Figure 24:
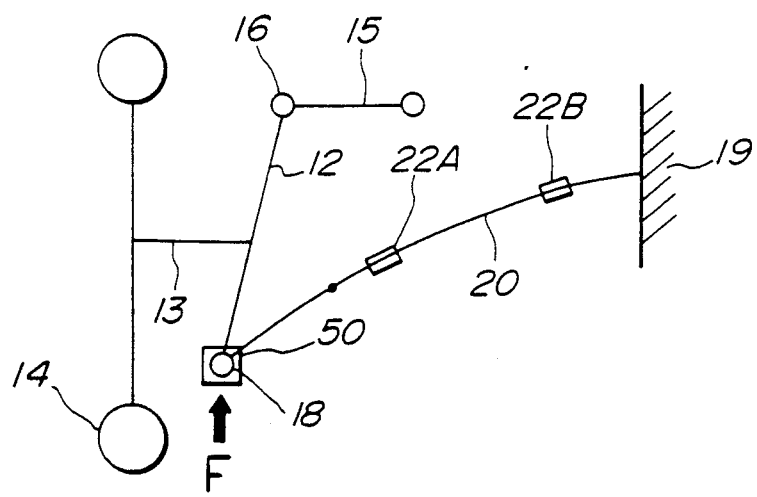
FIG. 24 is a schematic front elevational view of the mechanical arrangement of a modification of the suspension system shown in FIG. 23.

Suspension systems according to other embodiments shown in FIGS. 23 and 24 differ from the suspension systems shown in FIGS. 1 and 2 in that they additionally have a load detecting means. The components other than the load detecting means in FIGS. 23 and 24 will not be described below as they are the same as those shown in FIGS. 1 and 2. The double-wishbone-type suspension shown in FIG. 23 has a load detecting means 50 disposed at the joint 18 between the knuckle 12 and the lower control arm 17. The load detecting means 50 may instead be disposed at the joint between the lower control arm 17 and the leaf spring 20, as indicated by the broken line in FIG. 23. In the suspension shown in FIG. 24, the load detecting means 50 is positioned near the joint 18 between the leaf spring 20 and the knuckle 12.

If a resilient member such as a leaf spring has certain physical configurations and stable chemical properties, then a load (force) F applied to the resilient member and a strain or distortion s produced in a particular position on the resilient member in response to the load F are related to each other as follows:

$$\epsilon_N = f_p(F) \quad (25)$$

From the equation (1), the strains of the resilient member in a plurality of locations thereon can be expressed by:

$$\epsilon_1 = f_1(F)$$
$$\epsilon_2 = f_2(F)$$
$$\epsilon_3 = f_3(F)$$
$$\vdots$$

The theoretical value or estimated value $\epsilon'_N$ of a strain in a certain position can be obtained by detecting the load applied to the leaf spring 20 with the load detecting means 50 and substituting the measured value F into the equation (25). In the embodiments shown in FIGS. 23 and 24, the estimated value of the strain of the leaf spring in the position where the strain gauge 22A is located and the estimated value of the strain of the leaf spring in the position where the strain gauge 22B is located are expressed respectively by:

$$\epsilon'_1 = k_1 F$$

$$\epsilon'_2 = k_2 F$$

where $k_1$, $k_2$ are coefficients depending on the distances from the joint between the leaf spring 20 and the lower control arm 17 (FIG. 23) or between the leaf spring 20 and the knuckle 12 (FIG. 24) to the respective strain gauges 22A, 22B.

If the differences between the estimated values $\epsilon'_1$, $\epsilon'_2$ and the measured values $\epsilon_1$, $\epsilon_2$ are determined, a deteriorated condition of the leaf spring 20 can be judged. The differences $E_1$, $E_2$ between the measured values and the estimated values in the two positions are given as follows:

$$E_1 = |\epsilon'_1 - \epsilon_1|$$

$$E_2 = |\epsilon'_2 - \epsilon_2|$$

For example, if the leaf spring 20 is greatly deteriorated in the vicinity of the strain gauge 22B, the value of $\epsilon_2$ is large, and hence the value of $E_2$ is considerably large. When the suspension is normal, i.e., has no strain or distortion, since there is no difference between the measured and estimated values, the value of E is substantially zero.

Figure 25:
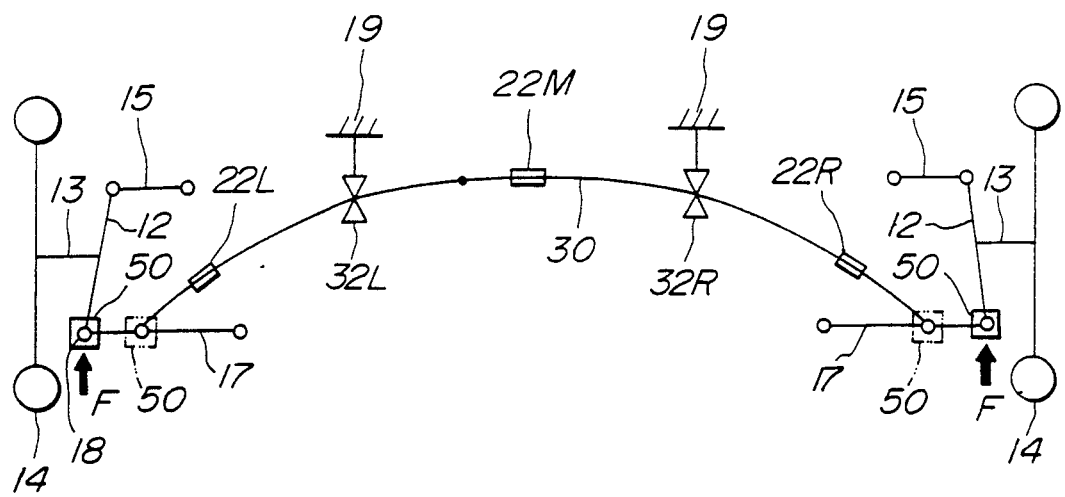
FIG. 25 is a schematic front elevational view of the mechanical arrangement of a motor vehicle suspension system according to still another embodiment of the present invention.
Figure 26:
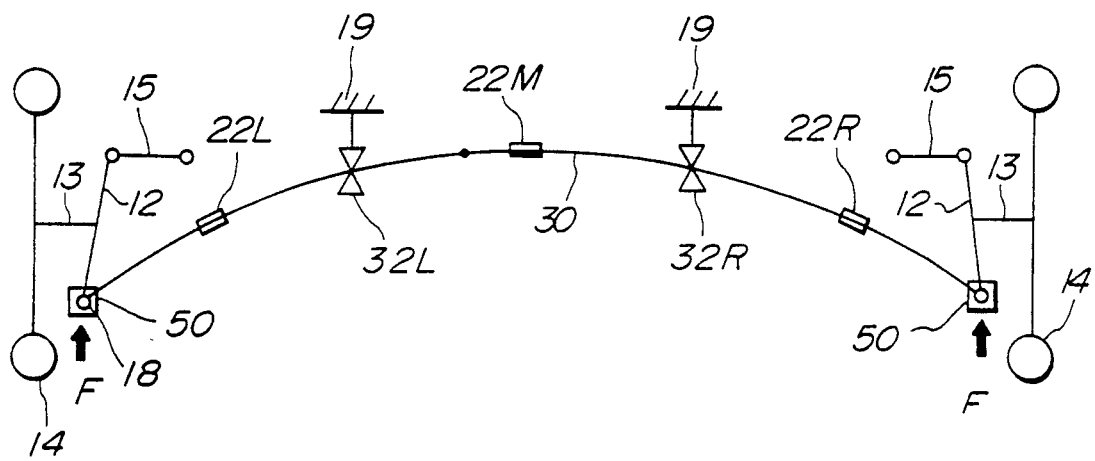
FIG. 26 is a schematic front elevational view of the mechanical arrangement of a motor vehicle suspension system according to yet another embodiment of the present invention.

Suspension systems according to other embodiments shown in FIGS. 25 and 26 differ from the suspension systems shown in FIGS. 8 and 9 in that they additionally have a load detecting means. The components other than the load detecting means in FIGS. 25 and 26 will not be described below as they are the same as those shown in FIGS. 8 and 9. Each double-wishbone-type suspension shown in FIG. 25 has a load detecting means 50 disposed at the joint 18 between the knuckle 12 and the lower control arm 17. The load detecting means 50 may instead be disposed at the joint 18 between the lower control arm 17 and the leaf spring 30, as indicated by the broken line in FIG. 25. In the suspension shown in FIG. 26, the load detecting means 50 is positioned near the joint 18 between the leaf spring 30 and the knuckle 12.

The theoretical values or estimated values $\epsilon'_1, \epsilon'_2, \epsilon'_3$ of strains of the leaf spring 30 in the positions where the strain gauges 22R, 22M, 22L are located can be determined if the measured loads detected by the two load detecting means 50 are substituted into the equation (25), as follows:

$$\epsilon'_1 = k_3 F_R \quad (26)$$
$$\epsilon'_2 = k_4 F_R + k_5 F_L$$
$$\epsilon'_3 = k_6 F_L$$

where $k_3, k_4, k_5, k_6$ are coefficients depending on the distances from the strain gauges to the joint between the leaf spring 30 and the lower control arm 17 or the knuckle 12. The differences between the estimated values $\epsilon'_1, \epsilon'_2, \epsilon'_3$ and the measured values $\epsilon_1, \epsilon_2, \epsilon_3$ actually detected by the strain gauges are given as follows:

$$E_1 = |\epsilon'_1 - \epsilon_1|$$
$$E_2 = |\epsilon'_2 - \epsilon_2|$$
$$E_3 = |\epsilon'_3 - \epsilon_3|$$

The position where the leaf spring 30 is deteriorated can be determined from the above differences. For example, if the leaf spring 30 is deteriorated between the support members 32R, 32L, then the value of $E_2$ is large, and if the leaf spring 30 is deteriorated between the support member 30 and one end of the leaf spring 30 near the support member 30, then the value of $E_1$ is large.

In an actual application, the suspension system has a computer which determines estimated strain values from a data map which stores the relationship between strain values and load values, or calculated values based on measured load values. Then, the computer compares the estimated strain values with the measured strain values to determine whether the leaf spring is deteriorated or not. If the leaf spring is found to be deteriorated, then the computer energizes a suitable alarm means to issue an alarm or a display means to display a deteriorated condition (see FIGS. 5 through 7).

In each of the above embodiments, the leaf spring may be vertically arranged, and the suspension may be of the strut type.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

What is claimed is:

1. A suspension system for use on a motor vehicle, comprising:
   suspension means including a resilient member;
   a plurality of strain detecting means mounted on said resilient member, for detecting strains of said resilient member;
   strain estimating means for estimating the value of a strain of said resilient member in a particular position thereon based on a measured value of a strain which is detected by at least one of said strain detecting means, said one strain detecting means being located in a position other than said particular position; and
   means for determining a deteriorated condition of said resilient member based on the detected strains, said determining means having means for comparing a measured value of a strain which is detected by another of said strain detecting means that is located in said particular position with said estimated value of the strain in said particular position.

2. A suspension system according to claim 1, wherein said strain estimating means has data map means for obtaining said estimated value of the strain in said particular position based on said measured value of said one strain detecting means.

3. A suspension system according to claim 1, wherein said strain estimating means has calculating means for obtaining said estimated value of the strain in said particular position based on said measured value of said one strain detecting means.

4. A suspension system according to claim 1, wherein at least one of said strain detecting means is disposed in a position where said resilient member is deteriorated at a speed different from speeds at which said resilient member can be deteriorated in other positions.

5. A suspension system according to claim 1, wherein at least one of said strain detecting means is disposed in a position where said resilient member is deteriorated at a highest speed among speeds at which said resilient member can be deteriorated.

6. A suspension system according to claim 5, wherein said resilient member has one end coupled through a joint to a motor vehicle body, said position where said resilient member is deteriorated at the highest speed being near said joint.

7. A suspension system according to claim 1, wherein said suspension means comprises a pair of laterally spaced suspensions, said resilient member extending between said suspensions and being supported on a motor vehicle body in two positions, said strain detecting means being at least three in number, and at least one of said strain detecting means being disposed in a position where said resilient member is deteriorated at a speed different from speeds at which said resilient member can be deteriorated in other positions.

8. A suspension system according to claim 7, wherein each of said suspensions comprises a steering knuckle, an upper control arm having one end swingably coupled to an upper end of said steering knuckle and an opposite end coupled to said motor vehicle body, and a lower control arm having one end swingably coupled to a lower end of said steering knuckle and an opposite end coupled to said motor vehicle body, and wherein said resilient member comprises a leaf spring having opposite ends connected respectively to the lower control arms of said suspensions, one of said three strain detecting means being disposed between said two positions, and the other two strain detecting means being disposed outwardly of said two positions.

9. A suspension system according to claim 7, wherein each of said suspensions further includes a steering knuckle, said resilient member comprising a leaf spring having opposite ends connected respectively to lower ends of the steering knuckles of said suspensions, one of said three strain detecting means being disposed between said two positions, and the other two strain detecting means being disposed outwardly of said two positions.

10. A suspension system according to claim 7, further comprising loading means for applying a known load to said resilient member, one of said three strain detecting means being disposed between said two positions, and the other two strain detecting means being disposed outwardly of said two positions.

11. A suspension according to claim 10, wherein said strain estimating means is adapted to estimate the value of said strain of said resilient member in said particular position thereon also based on the value of a known load applied by said loading means.

12. A suspension system according to claim 10, wherein said known load is a distributed load applied to said resilient member between said two positions.

13. A suspension system according to claim 1, further comprising loading means for applying an unknown load to said resilient member, said resilient member being supported on a motor vehicle body in two positions, and said strain detecting means being at least five in number.

14. A suspension system according to claim 13, wherein said unknown load is applied to said resilient member between said two positions, three of said strain detecting means being disposed between said two positions, and the other two strain detecting means being disposed outwardly of said two positions.

15. A suspension system for use on a motor vehicle, comprising:
   suspension means including a resilient member;
   load detecting means mounted on said suspension means, for detecting a load applied to said resilient member;
   strain detecting means mounted on said resilient member, for detecting a strain of said resilient member; and
   means for determining a deteriorated condition of said resilient member based on the detected load and the detected strain.

16. A suspension system according to claim 15, further comprising strain estimating means for estimating the value of a strain of said resilient member in a particular position thereon, based on the value of the load detected by said load detecting means.

17. A suspension system according to claim 16, wherein said strain estimating means has data map means for obtaining said estimated value of the strain in said particular position based..on said detected value of the load, and said determining means has comparing means for comparing said measured value of the strain which is detected by said strain detecting means with said estimated value of the strain which is obtained by said data map means.

18. A suspension system according to claim 16, wherein said strain estimating means has calculating means for obtaining said estimated value of the strain in said particular position based ,on said detected value of the load, and said determining means has comparing means for comparing said measured value of the strain which is detected by said strain detecting means with said estimated value of the strain which is obtained by said calculating means.

19. A suspension system according to claim 15, wherein said suspension means comprises a pair of laterally spaced suspensions, each of said suspensions comprising a steering knuckle, an upper control arm having one end swingably coupled to an upper end of said steering knuckle and an opposite end swingably coupled to a motor vehicle body, and a lower control arm having one end swingably coupled to a lower end of said steering knuckle and an opposite end swingably coupled to said motor vehicle body, and wherein said load detecting means being disposed at a joint where the steering knuckle is coupled to the lower control arm in each of said suspensions.

20. A suspension system according to claim 19, wherein said resilient member comprises a leaf spring which extends between the lower control arms of said suspensions.

21. A suspension system according to claim 15, wherein said suspension means comprises a pair of laterally spaced suspensions, each of said suspensions comprising a steering knuckle, an upper control arm having one end swingably coupled to an upper end of said steering knuckle and an opposite end swingably coupled to a motor vehicle body, and a lower control arm having one end swingably coupled to a lower end of said steering knuckle and an opposite end swingably coupled to said motor vehicle body, and wherein said load detecting means is disposed at a joint where the resilient member is coupled to the lower control arm in each of said suspensions.

22. A suspension system according to claim 15, wherein said suspension means comprises a pair of laterally spaced suspensions, each of said suspensions comprising a steering knuckle, said resilient member being swingably coupled to lower ends of the steering knuckles of said suspensions, said load detecting means being disposed at a joint where the resilient member is coupled to the steering knuckle in each of said suspensions.

23. A suspension system according to claim 15, wherein said suspension means comprises a pair of laterally spaced suspensions, each of said suspensions comprising a steering knuckle, said resilient member comprising a leaf spring which extends between lower ends of the steering knuckles of said suspensions.

24. A suspension system for use on a motor vehicle, comprising:
   a suspension including a resilient member;
   parameter generating means mounted on said suspension, for generating a parameter with respect to said suspension;
   strain detecting means mounted on said resilient member, for detecting a strain of said resilient member; and
   means for determining a deteriorated condition of said resilient member based on the detected parameter and the detected strain.

25. A suspension system according to claim 24, wherein said parameter generating means comprises load detecting means, said parameter being the value of a load applied to said resilient member and detected by said load detecting means.

26. A suspension system according to claim 25, further comprising strain estimating means for estimating the value of a strain of said resilient member in a particular position thereon, based on the value of the load which is detected by said load detecting means.

27. A suspension system according to claim 26, wherein said strain estimating means has data map means for obtaining said estimated value of the strain in said particular position based on said detected value of the load, and said determining means has comparing means for comparing said measured value of the strain which is detected by said strain detecting means with said estimated value of the strain which is obtained by said data map means.

28. A suspension system according to claim 26, wherein said strain estimating means has calculating means for obtaining said estimated value of the strain in said particular position based on said detected value of the load, and said decision means has comparing means for comparing said measured value of the strain which is detected by said strain detecting means with said estimated value of the strain which is obtained by said calculating means.

29. A suspension system according to claim 24, further comprising strain estimating means for estimating the value of a strain of said resilient member in a particular position thereon, based on the measured value of a strain which is detected by said strain detecting means.

30. A suspension system according to claim 29, wherein said parameter generating means comprises another strain detecting means for detecting the actual value of a strain of said resilient member in said particular position.

31. A suspension system according to claim 30, wherein each of said strain detecting means comprises a strain gauge.

32. A suspension system according to claim 24, further including means for providing an indication to a vehicle operator when a deteriorated condition of said resilient member is determined by said determining means.

* * * * *

UNITED STATES PATENT AND TRADEMARK OFFICE
CERTIFICATE OF CORRECTION

PATENT NO. : 5,058,918

DATED : October 22, 1991

INVENTOR(S) : K. Nakaya et al.

It is certified that error appears in the above-identified patent and that said Letters Patent is hereby corrected as shown below:

Column 2, line 6, change "gages" to --gauges--;
        line 30, change "gauges" to --gauge--.

Column 4, line 63, change "s" to --e--.

Column 5, line 37, change "estimated-" to --estimated--.

Column 6, line 2, change "gages" to --gauges--;
        line 42, change $E_1 > \alpha$ to --$E'_1 > \alpha$--;
        line 44, change $E_2^1 > \beta$ to --$E'_2^1 > \beta$--.

Column 7, line 18, change "supoprted" to --supported--;
        line 30, change "regions-" to --regions--;
        line 36, change "deriorated" to --deteriorated--.

Column 8, line 63, change "systms" to --systems--.

Column 9, line 7, after "air" (first occurence) delete comma and after after "air" (second occurence) insert a comma.

Column 10, line 22, change "22Lm to --22LM--;
         line 24, change "gages" to --gauges--.

Column 11, line 13, in the equation change "$K_3 e_{LM2-}$" to --$K_3 e_{LM2}$--;
         line 38, in the equation change "$K_3 e_{LM3-}$" to --$K_3 e_{LM3}$--.

Column 12, line 6, change "s" to --e--.

UNITED STATES PATENT AND TRADEMARK OFFICE
CERTIFICATE OF CORRECTION

PATENT NO. : 5,058,918

DATED : October 22, 1991

INVENTOR(S) : Katsunori Nakaya, et al.

Page 2 of 2

It is certified that error appears in the above-identified patent and that said Letters Patent is hereby corrected as shown below:

Column 15, line 60, change "based. ." to --based--.

Column 16, line 1, change "based," to --based--.

Column 17, line 19, change "decision" to --determining--.

Signed and Sealed this

Second Day of March, 1993

Attest:

STEPHEN G. KUNIN

Attesting Officer

Acting Commissioner of Patents and Trademarks